Oct. 21, 1924.　　　　　　　　　　　　　　1,512,684
A. GAGG
ROTARY VALVE FOR PIPE LINES
Filed March 19, 1924
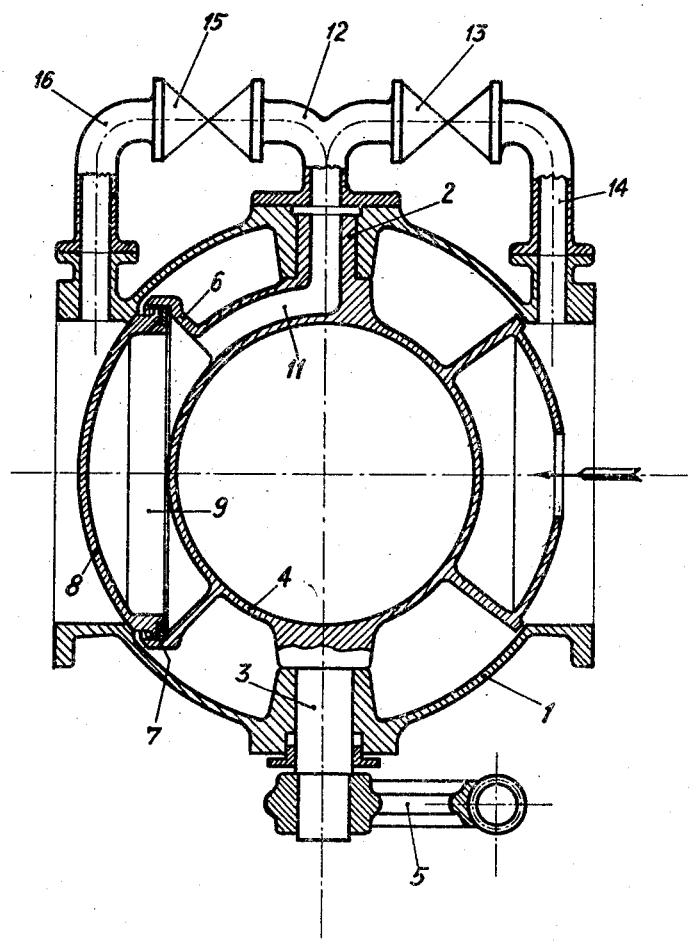
Inventor
Anton Gagg.

Patented Oct. 21, 1924.

1,512,684

UNITED STATES PATENT OFFICE.

ANTON GAGG, OF ZURICH, SWITZERLAND, ASSIGNOR TO AKTIENGESELLSCHAFT DER MASCHINENFABRIKEN ESCHER WYSS & CIE., OF ZURICH, SWITZERLAND.

ROTARY VALVE FOR PIPE LINES.

Application filed March 19, 1924. Serial No. 700,334.

*To all whom it may concern:*

Be it known that I, ANTON GAGG, a citizen of the Republic of Switzerland, residing at Zurich, Switzerland, have invented certain new and useful Improvements in Rotary Valves for Pipe Lines, of which the following is a specification, reference being had therein to the accompanying drawing.

Rotary valves for pipe lines are already known which are provided with a closing disc having a packing face and being movably arranged in the rotary gate body. In front of the closing disc a hollow space having a heavily throttled supply for the medium under pressure and a comparatively large discharge pipe is arranged so that the closing disc may be relieved of the pressure by opening the discharge pipe in order to render possible an easier opening of the gate. With this known arrangement a certain quantity of liquid flows continuously through the throttled supply into the hollow space arranged in front of the closing disc so that, even when the discharge pipe is full open, always a pressure, if only a comparatively low one, is present in the hollow space. This pressure causes friction on the nonlubricated tightening faces of the gate whereby the movement of the gate is rendered more difficult particularly with water containing grit or with very high water pressures.

The object of the present invention is to avoid this disadvantage inherent to rotary valves of the above mentioned type, to which end according to the present invention instead of the continuously throttled supply a supply conduit having closing means is connected to the hollow space. Further a discharge conduit which is also provided with closing means is connected to the hollow space. When the supply or pressure conduit is closed and the discharge or relief conduit is opened, no liquid under pressure can enter into the hollow space and consequently the pressure inside the latter escapes or disappears completely. In the latter case the total pressure acting upon the rotary gate body is then taken up by the lubricated journals of the rotary body whereby the friction is reduced to a minimum amount.

A constructional example of the subject matter of the present invention is illustrated in a section through the rotary valve with its gate in the closed position. In the spherical valve casing 1 the journals 2 and 3 of the rotary body 4 are rotatably mounted. Upon the elongated part of the journal 3 a gear 5 is fixed, by the operation of which the rotary body 4 can be turned. The latter is provided with an extension 6 having a short cylindrical flange 7 in which the closing or packing disc 8 is movably arranged. The disc 8 is provided on its circumference with a packing (for instance a leather ring, a metallic ring or the like), for tightening purposes. The hollow space 9 formed by the gate body 4 with the extension 6 and the closing disc 8 is in open connection by means of a channel 11 provided in the casting and leading through the journal 2 with a T-piece 12, which is connected on one side to a pressure supply conduit 14 through the interposition of a shut-off organ 13 and on the other side to a discharge conduit 16 through the interposition of a shut-off organ 15.

When the rotary valve has to remain in its closed position the shut-off organ 15 in the form of a valve remains closed and the valve 13 is opened. Inside the space 9 the total pressure existing in the pipe line in front of the rotary valve will be present and the closing disc 8 is therefore pressed against its seat provided in the valve casing 1, whereby a complete tightening effect is obtained. For the purpose of opening the rotary valve the valve 13 is closed and the valve 15 is opened; the pressure inside the space 9 escapes then completely and the whole pressure acting on the gate body is then taken up by the two journals 2 and 3.

The advantage inherent to the valve according to the present invention over known constructions consists in the fact that a complete relief of the closing disc 8 from pressure is obtainable and that with the closing disc 8 relieved, the pressure acting upon the valve body is totally taken up by the journals 2, 3.

I claim:

1. In a rotary valve, a casing, a journalled gate body therein, a closing member carried by said gate body and confining together with the latter a hollow space, closable means in connection with said space and adapted to supply pressure liquid to said space, and closable means connected with said space and adapted to discharge liquid from said space.

2. In a rotary valve, a casing, a journalled gate body therein, a closing member movably mounted in said gate body and confining together with the latter a hollow space, a closable conduit in connection with said space and with the pressure side of the valve, and a closable conduit in connection with said space and adapted to relieve the pressure in said space.

3. In a rotary valve, a casing, a gate body therein, a closing member movably mounted in said gate body and confining together with the latter a hollow space, journals for said gate body, a closable conduit in connection with said space and with the pressure side of the valve, and a closable conduit in connection with said space and adapted to relieve the pressure in said space, the connection between said conduits and the hollow space including a channel common to both and provided in one of the two journals of said gate body.

4. In a rotary valve, a spherical casing, a tubular gate therein, journals provided on said tubular gate and rotatably mounted in the casing, a closing member movably mounted in said gate body and confining together with the latter a hollow space, a closable conduit in connection with said space and with the pressure side of the valve, and a closable conduit in connection with said space and adapted to relieve the pressure in said space.

5. In a rotary valve, a casing, a gate body therein, a closing member movably supported by said gate body and confining together with the latter a hollow space, journals for said gate body, a conduit in connection with said space and with the pressure side of the valve, a shut-off organ inserted in said conduit, a second conduit in connection with said space, and adapted to relieve the hydraulic pressure in said space, a shut-off organ inserted in said second conduit, the connection between said conduits and the hollow space including a channel provided in one of the two journals of said gate body.

6. In a rotary valve, a spherical casing, a tubular gate therein, journals for said tubular gate, a closing member movably supported by said gate body and confining together with the latter a hollow space, journals for said gate body, a conduit in connection with said space and with the pressure side of the valve, a shut-off organ inserted in said conduit, a second conduit in connection with said space and adapted to relieve the hydraulic pressure in said space, a shut-off organ inserted in said second conduit, the connection between said conduits and the hollow space including a channel provided in one of the two journals of said gate body.

In testimony that I claim the foregoing as my invention, I have signed my name.

ANTON GAGG.